(12) United States Patent
Seo et al.

(10) Patent No.: US 10,313,971 B2
(45) Date of Patent: Jun. 4, 2019

(54) APPARATUS AND METHOD FOR CONTROLLING POWER

(71) Applicants: Sang-Ho Seo, Gyeonggi-do (KR); Kee-Moon Chun, Gyeonggi-do (KR); Jun-Ho Huh, Gyeonggi-do (KR)

(72) Inventors: Sang-Ho Seo, Gyeonggi-do (KR); Kee-Moon Chun, Gyeonggi-do (KR); Jun-Ho Huh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 245 days.

(21) Appl. No.: 14/996,630

(22) Filed: Jan. 15, 2016

(65) Prior Publication Data
US 2016/0212705 A1   Jul. 21, 2016

(30) Foreign Application Priority Data
Jan. 15, 2015   (KR) .................. 10-2015-0007250

(51) Int. Cl.
    *H04W 4/00*       (2018.01)
    *H04W 52/02*      (2009.01)
    *H04L 1/00*       (2006.01)

(52) U.S. Cl.
    CPC .......... *H04W 52/0216* (2013.01); *H04L 1/00* (2013.01); *Y02D 70/142* (2018.01); *Y02D 70/144* (2018.01); *Y02D 70/162* (2018.01)

(58) Field of Classification Search
    None
    See application file for complete search history.

(56) References Cited

U.S. PATENT DOCUMENTS

| | | | |
|---|---|---|---|
| 2005/0141475 A1* | 6/2005 | Vijayan | H04W 4/06 370/345 |
| 2006/0099980 A1* | 5/2006 | Nielsen | H04L 7/0079 455/507 |
| 2009/0279464 A1* | 11/2009 | Kakani | H04W 76/023 370/311 |
| 2012/0257558 A1 | 10/2012 | Shin et al. | |

(Continued)

OTHER PUBLICATIONS

IEEE Computer Society, IEEE Standard for Information technology—Telecommunications and information exchange between systems Local and metropolitan area networks—Specific requirements, Part 11: Wireless LAN Medium Access Control (MAC) and Physical Layer (PHY) Specifications, Mar. 29, 2012, IEEE Std 802.11™—2012, Revision of IEEE Std 802.11—2007.

(Continued)

*Primary Examiner* — Zewdu A Beyen
(74) *Attorney, Agent, or Firm* — The Farrell Law Firm, P.C.

(57) ABSTRACT

An apparatus, method, chipset, and non-transitory computer-readable storage medium for controlling power are provided. The apparatus includes a receiver configured to receive a data frame and first information related to a next data frame of the data frame; and a controller configured to determine an operation mode as an active mode or a sleep mode based on destination address information of the next data frame and duration information indicating a time during which transmission of the next data frame occurs, wherein the destination address information and the duration information are included in the first information.

20 Claims, 10 Drawing Sheets

(56) References Cited

U.S. PATENT DOCUMENTS

| | | | |
|---|---|---|---|
| 2012/0275602 A1* | 11/2012 | Mason | H04H 20/47 |
| | | | 381/2 |
| 2013/0329658 A1* | 12/2013 | Liu | H04W 74/02 |
| | | | 370/329 |
| 2014/0119291 A1 | 5/2014 | Lee et al. | |
| 2014/0146724 A1 | 5/2014 | Ren | |

OTHER PUBLICATIONS

Zhang et al., E-MiLi: energy-minimizing idle listening in wireless networks, IEEE Transactions on Mobile Computing, vol. 11, No. 9, Sep. 2012, pp. 1441-1454.

\* cited by examiner

APPARATUS AND METHOD FOR CONTROLLING POWER

PRIORITY

This application claims priority under 35 U.S.C. § 119(a) to a Korean Patent Application filed in the Korean Intellectual Property Office on Jan. 15, 2015 and assigned Serial No. 10-2015-0007250, the entire content of which is incorporated herein by reference.

BACKGROUND

1. Field of the Disclosure

The present disclosure relates generally to an apparatus for and a method of controlling power of a terminal, and more particularly, to an apparatus for and a method of controlling power consumption in an idle listening (IL) period of a terminal.

2. Description of the Related Art

Connectivity technology based on wireless fidelity (Wi-Fi) has been used in a variety of applications due to its advantages of high throughput, wireless connection, multi-connection and/or easy network management.

Disadvantageously, however, Wi-Fi is higher in power consumption compared with connectivity technology based on Bluetooth, Zigbee or the like since a wireless channel is acquired in a contention manner. In other words, a carrier sense multiple access with collision avoidance (CSMA/CA) scheme, which is one of the basics of wireless local area network (WLAN) medium access control (MAC) technology, must sense a channel, for collision avoidance, and in order to perform channel sensing, the CSMA/CA scheme must enable a reception mode at all times even when there is no data to transmit. The period in which the reception mode is enabled, even when there is no data to transmit, is referred to as an IL period, and 60% or more of the power consumed in a Wi-Fi terminal may be consumed in the IL period.

Therefore, there is a need for a method for reducing power consumption in an IL period and a method for directly controlling power of a terminal.

SUMMARY

An aspect of the present disclosure is to provide an apparatus for and a method of controlling power of a terminal.

Another aspect of the present disclosure is to provide an apparatus for and a method of controlling power that is consumed in an IL period of a terminal.

Another aspect of the present disclosure is to provide an apparatus for and a method of controlling power based on information related to a next data frame of a current data frame.

Another aspect of the present disclosure is to provide an apparatus for and a method of controlling power by determining an operation mode of a terminal as a sleep mode or an active mode in an IL period of the terminal.

Another aspect of the present disclosure is to provide an apparatus for and a method of controlling power by determining an operation mode of a terminal as a sleep mode or an active mode based on information related to a next data frame of a current data frame.

In accordance with an aspect of the present disclosure, there is provided an apparatus for controlling power. The apparatus includes a receiver configured to receive a data frame and first information related to a next data frame of the data frame; and a controller configured to determine an operation mode as an active mode or a sleep mode based on destination address information of the next data frame and duration information indicating a time during which transmission of the next data frame occurs, wherein the destination address information and the duration information are included in the first information.

In accordance with another aspect of the present disclosure, there is provided a method of controlling power of a terminal. The method includes receiving a data frame and first information related to a next data frame of the data frame; and determining an operation mode as an active mode or a sleep mode based on destination address information of the next data frame and duration information indicating a time during which transmission of the next data frame occurs, wherein the destination address information and the duration information are included in the first information.

In accordance with another aspect of the present disclosure, there is provided a chipset for controlling power of a terminal. The chipset is configured to receive a data frame and first information related to a next data frame of the data frame; and determine an operation mode as an active mode or a sleep mode based on account destination address information of the next data frame and duration information indicating a time during which transmission of the next data frame occurs, wherein the destination address information and the duration information are included in the first information.

In accordance with another aspect of the present disclosure, there is provided a non-transitory computer-readable storage medium including a computer program for executing a method of controlling power of a terminal. The method includes receiving a data frame and first information related to a next data frame of the data frame; and determining an operation mode as an active mode or a sleep mode based on account destination address information of the next data frame and duration information indicating a time during which transmission of the next data frame occurs, wherein the destination address information and the duration information are included in the first information.

BRIEF DESCRIPTION OF THE DRAWINGS

The above and other aspects, features and advantages of certain exemplary embodiments of the present disclosure will be more apparent from the following description, taken in conjunction with the accompanying drawings, in which.

DETAILED DESCRIPTION OF EMBODIMENTS OF THE PRESENT INVENTION

Figure 1:
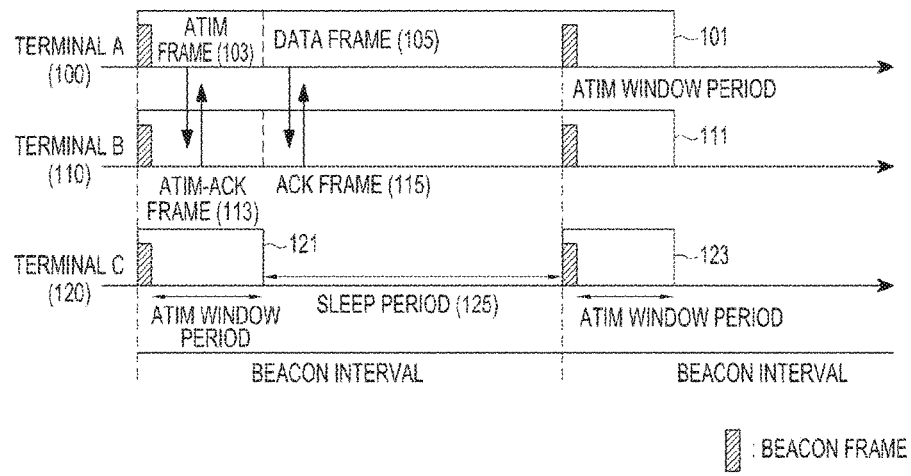
FIG. 1 illustrates an example of a window period and a sleep period that are based on transmission of a data frame by each terminal in a power save mode.

The following description with reference to the accompanying drawings is provided to assist in a comprehensive understanding of exemplary embodiments of the present disclosure as defined by the appended claims and their equivalents. It includes various details to assist in that understanding but these are to be regarded as merely exemplary. Accordingly, those of ordinary skilled in the art will recognize that various changes and modifications of the embodiments described herein can be made without departing from the scope and spirit of the present disclosure. In addition, descriptions of well-known functions and constructions may be omitted for clarity and conciseness. Throughout the drawings, like reference numerals will be understood to refer to like parts, components, and structures.

The terms used in the following description and claims are not limited to their dictionary meanings, but, are merely used to enable a clear and consistent understanding of the present disclosure. Accordingly, it should be apparent to those skilled in the art that the following description of exemplary embodiments of the present disclosure is provided for illustration purpose only and not for the purpose of limiting the present disclosure as defined by the appended claims and their equivalents.

It is to be understood that the singular forms "a," "an," and "the" include plural forms unless the context clearly dictates otherwise. Thus, for example, a reference to "a component surface" includes a reference to one or more of such surfaces.

By the term "substantially" it is indicated that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the power save mode defined in a standard, an access point (AP) or a source terminal may buffer data to transmit, and then periodically transmit the buffered data to related terminals. In this case, the transmission time may be based on a period of a beacon frame (i.e., a beacon interval), and the data to be transmitted may indicate a traffic indication map (TIM) including an identifier (ID) of a related terminal. Each of the terminals may wake up at a period of a beacon frame, and then analyze a TIM included in the beacon frame and perform data transmission/reception. The TIM may be classified into a delivery TIM (DTIM) for transmitting a broadcast frame and an ad hoc TIM (ATIM) for transmitting a unicast frame depending on the network type.

FIG. 1 illustrates an example of a window period and a sleep period that are based on transmission of a data frame by each terminal in a power save mode.

Referring to FIG. 1, a terminal A 100 may transmit an ATIM frame 103 to a terminal B 110, and the terminal B 110 may transmit an ATIM-acknowledgement (ATIM-ACK) frame 113 to the terminal A 100. Thereafter, the terminal A 100 may transmit a data frame 105 that has been buffered during an ATIM window period 101 to the terminal B 110. The terminal B 110 may also receive the data frame 105 that has been transmitted from the terminal A 100 during an ATIM window period 111, and transmit an ACK frame 115 for the data frame 105 to the terminal A 100. The ATIM window periods 101 and 111 indicate the periods in which the terminal A 100 and the terminal B 110 are awake. In other words, the ATIM window periods 101 and 111 indicate the periods in which the terminal A 100 and the terminal B 110 transmit and receive the data frame 105 while operating in an active mode.

A terminal C 120, which does not transmit and receive the data frame 105 during the ATIM window periods 101 and 111, may operate in a sleep mode until the next window period 123 starts after a window period 121. In this case, the period in which the terminal C 120 operates in the sleep mode is defined as a sleep period 125.

However, in the power save mode described in FIG. 1, power consumption may occur for transmission/reception of an ATIM frame and an ATIM-ACK frame, and the throughput may be reduced due to the ATIM window periods. This phenomenon may be more serious in a network environment where the density of terminals is high. Further, in the power save mode described in FIG. 1, the buffered data may not be transmitted immediately, causing a relatively large latency.

Figure 2:
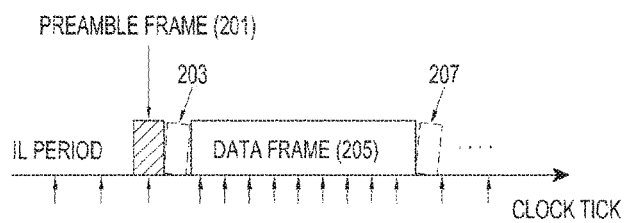
FIG. 2 illustrates an example of receiving a data frame during an IL period in a power save mode.

FIG. 2 illustrates an example of receiving a data frame during an IL period in a power save mode.

Referring to FIG. 2, after a terminal detects a preamble frame 201 with a low-rate clock frequency in an IL period, and if the detected preamble frame 201 is a frame for the terminal, the terminal may restore the clock frequency to a full-rate clock frequency while dummy bits are received, i.e., during a period 203, to receive a data frame 205. In this case, since the rate of the clock frequency can be adjusted depending on the network conditions, it is possible to obtain the maximum power saving effects. In addition, since the preamble frame 201 includes an address of a terminal which is a receiving terminal, in its own format, the above receiving operation may be performed only in that terminal. After completing the reception of the data frame 205, the terminal may decrease the rate of the clock frequency in a period 207.

However, since a length of the preamble frame 201 should increase in proportion to the number of network nodes, a preamble frame may be long in length in the network environment where the density of network nodes is high. In addition, the channel protection effect by the request to send (RTS)/clear to send (CTS) scheme may be reduced due to the long-length preamble frame.

In contrast, another terminal other than the terminal should set a network allocation vector (NAV) value based on duration information. However, in the power save mode described in FIG. 2, if a preamble frame that the terminal has detected is not a frame for the terminal, the terminal doesn't perform decoding, so channels may not be protected.

In addition, the power save mode described in FIG. 2 may minimize the power consumption by lowering the operating frequency of a digital part of the terminal. However, since the ratio of the power consumed in the digital part to the total power consumed in the terminal is only about 2%, the power save mode described in FIG. 2 is negligible in terms of the power saving effects.

In a below-described embodiment of the present disclosure, there is provided a way to control up to the analog frequency/radio frequency (RF) power with the minimum frame overhead that doesn't affect the existing device.

If there is data to transmit, a terminal based on a MAC protocol may check the channel state by sensing a channel, and if the checked channel state is determined as an idle state under certain conditions, the terminal may transmit the data over the channel in the idle state. In contrast, if the checked channel state is not determined as an idle state (i.e., if the checked channel state is determined as a busy state), the terminal may store the data to transmit in its memory, and continuously check the channel state by sensing a channel. A phenomenon where data to be transmitted is accumulated in a memory may occur more frequently as the amount of data to be transmitted increases, or as the number of channels in the busy state increases.

Figure 3:
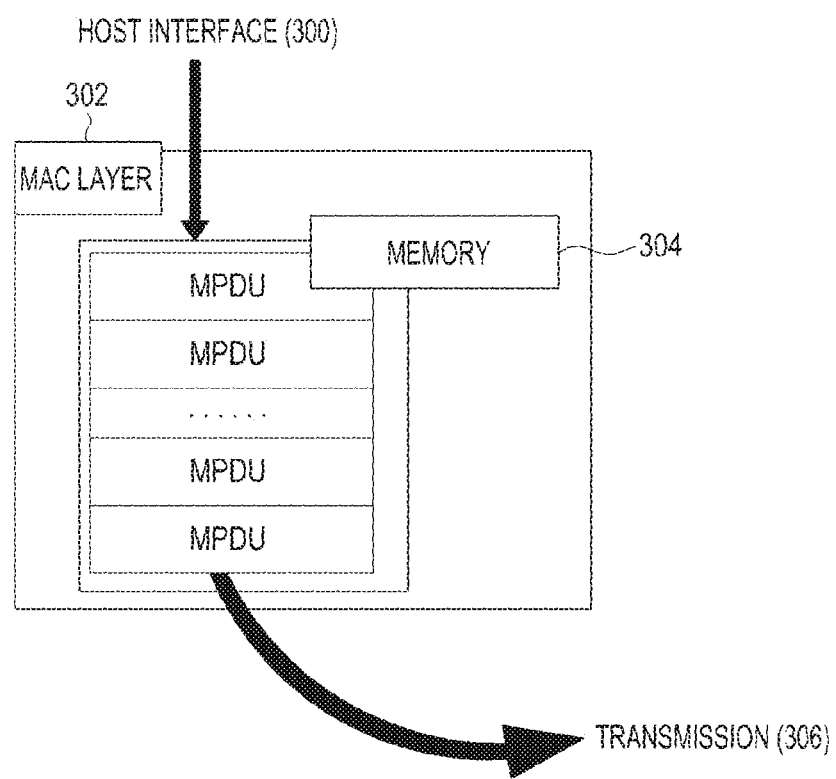
FIG. 3 illustrates an example of transmitting data by a terminal that is based on a MAC protocol.

FIG. 3 illustrates an example of transmitting data by a terminal that is based on a MAC protocol.

Referring to FIG. 3, upon detecting data that is delivered from a host interface 300 and/or other devices to a MAC layer 302, a terminal may check the channel state by sensing a channel. Thereafter, if the checked channel state is determined as a busy state under certain conditions, the terminal may store the detected data in its memory 304 in the format of a MAC protocol data unit (MPDU) frame. Thereafter, the terminal may continuously check the channel state by sensing a channel, and if the channel state is determined as an idle state under certain conditions, the terminal may transmit the MPDU frame stored in the memory 304 as shown by reference numeral 306.

A plurality of MPDU frames may be stored in the memory 304 shown in FIG. 3. If two or more MPDU frames are stored in the memory 304, the terminal may access not only the information about the currently transmitted data, but also the information about the data that is to be transmitted right after the current data. In a below-described embodiment of the present disclosure, there is provided a way to deliver in advance the information about the data that is to be transmitted after the currently transmitted data to other terminals existing on a wireless channel, to schedule a sleep time and a wake-up time for each of the other terminals. The information about the data to be transmitted next may be included in a presentation protocol data unit (PPDU) frame in an additional information format, and a format of the information about the data to be transmitted next is as shown in Table 1 below.

TABLE 1

| Signature | Address | Duration |
---

In other words, the information related to the data that is to be transmitted after the currently transmitted data may include signature information, address information and duration information, and may be located in front of the PPDU frame, or at the rear of (or behind) the PPDU frame. In the following, the information related to the data that is to be transmitted after the currently transmitted data, which includes the signature information, address information and duration information, will be referred to as Signature/Address/Duration (SAD) information.

The signature information in the SAD information is information for determining whether the SAD information is located in front of the PPDU frame, or at the rear of the PPDU frame, and may be configured in a minimum format for channel detection.

The address information in the SAD information indicates a destination address (RaSAD) of the data that is to be transmitted next.

The duration information in the SAD information indicates the time during which the data to be transmitted next may be transmitted, and the duration information may include, for example, information StsSAD indicating a start time of a transaction process for the data to be transmitted next, and information EtsSAD indicating an end time of a transaction process for the data to be transmitted next.

Figure 4:
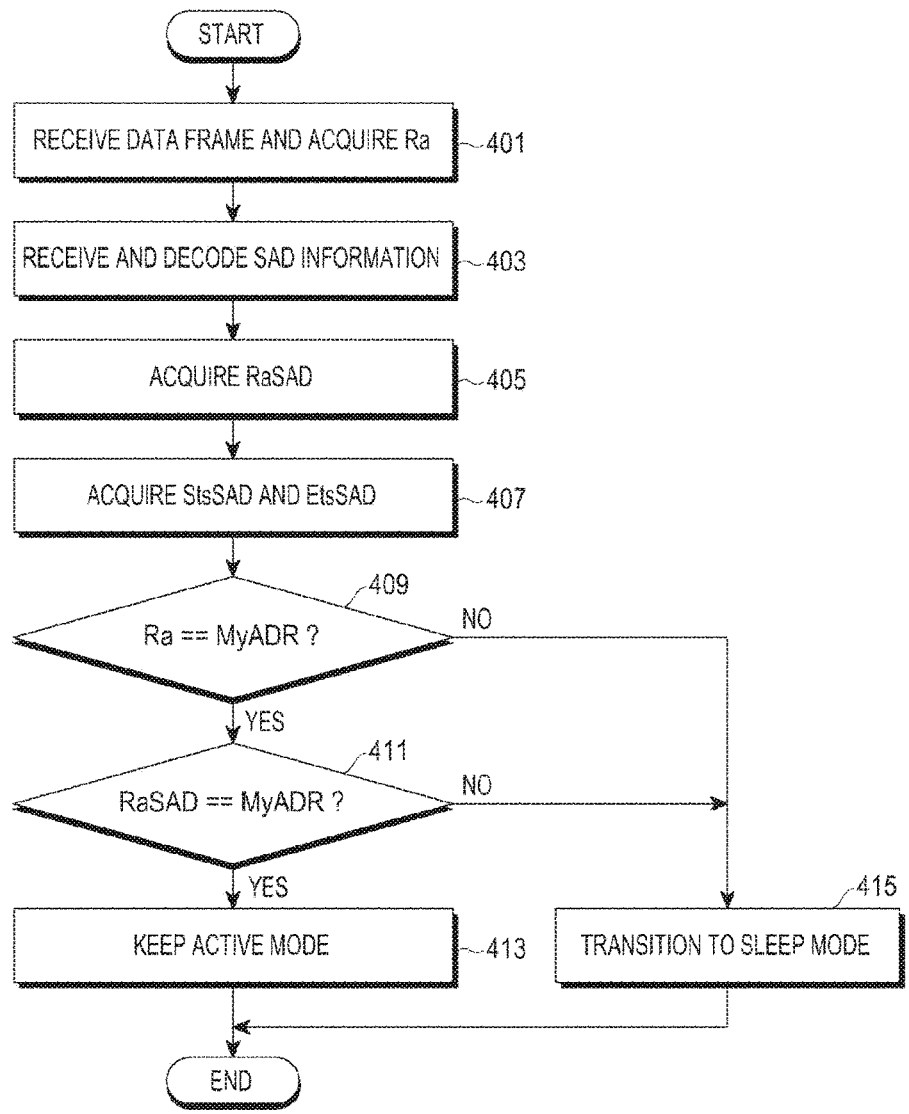
FIG. 4 is a flowchart of a method of changing an operation mode by a terminal in a power save mode according to an embodiment of the present disclosure.

FIG. 4 is a flowchart of a method of changing an operation mode by a terminal in a power save mode according to an embodiment of the present disclosure.

Referring to FIG. 4, in step 401, the terminal may receive a data frame in an IL period and acquire a destination address Ra of the currently received data frame. In step 403, the terminal may receive SAD information and decode the received SAD information.

In step 405, the terminal may acquire a destination address RaSAD of a data frame that is to be received after the currently received frame, from the decoded SAD information. In step 407, the terminal may acquire, from the decoded SAD information, information StsSAD indicating a start time of a transaction process for a data frame to be received after the current data frame, and information EtsSAD indicating an end time of a transaction process for a data frame to be received after the current data frame.

In step 409, the terminal may determine whether the currently received data frame is its own frame, by checking whether the destination address Ra acquired in step 401 is the same as its own address MyADR. If it is determined in step 409 that Ra is the same as MyADR (i.e., the currently received data frame is its own frame), the terminal may determine in step 411 whether the data frame to be received next is its own frame, by checking whether the destination address RaSAD acquired in step 405 is the same as MyADR. If it is determined in step 411 that RaSAD is the same as MyADR (i.e., the data frame to be received next is its own frame), the terminal may keep the current operation mode (i.e., the active mode) in step 413.

However, if it is determined in step 409 that Ra is different from MyADR (i.e., the currently received data frame is not its own frame), the terminal may immediately change its operation mode to the sleep mode in step 415. The terminal may keep the sleep mode until the time indicated by StsSAD if RaSAD is the same as MyADR, and may keep the sleep mode until the time indicated by EtsSAD if RaSAD is different from MyADR.

Further, if it is determined in step 411 that RaSAD is different from MyADR (i.e., the data frame to be received next is not its own frame), the terminal may complete the transaction process for the current data frame, and then change its operation mode to the sleep mode in step 415. The terminal may keep the sleep mode until the time indicated by EtsSAD.

Figure 5:
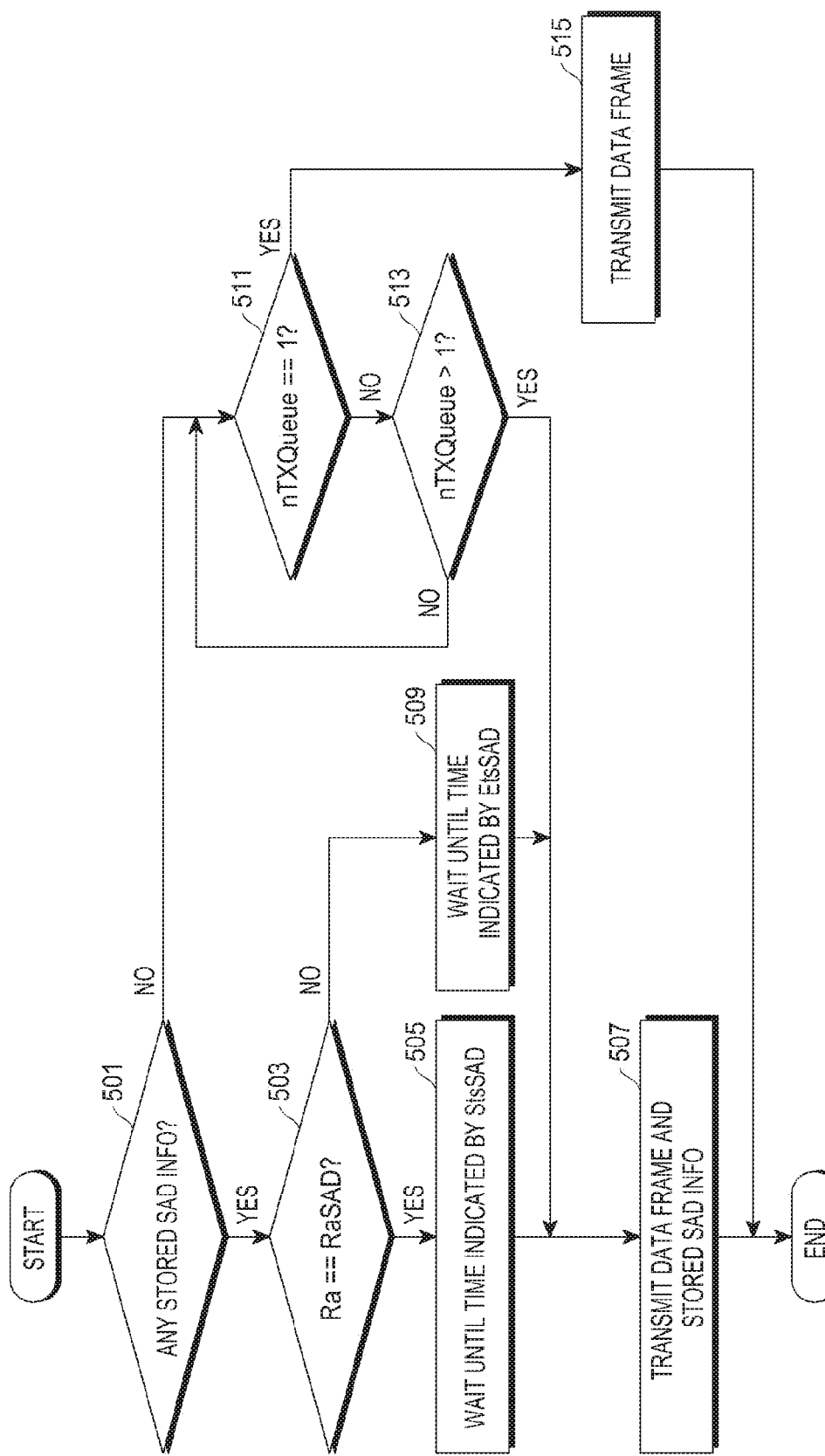
FIG. 5 is a flowchart of a method of transmitting a data frame by a terminal in a power save mode according to an embodiment of the present disclosure.

FIG. 5 is a flowchart of a method of transmitting a data frame by a terminal in a power save mode according to an embodiment of the present disclosure.

Referring to FIG. 5, a terminal, in which a data frame to be transmitted is generated in an IL period, may determine in step 501 whether stored SAD information is present.

If it is determined in step 501 that stored SAD information is preset, the terminal may determine in step 503 whether a destination address Ra of the generated data frame (i.e., a data frame to be currently transmitted) is the same as a destination address RaSAD of the next data frame to be transmitted.

If it is determined in step 503 that Ra is the same as RaSAD, the terminal may wait until the time indicated by StsSAD (i.e., information indicating a start time of a transaction process for a data frame to be transmitted next) included in duration information in the SAD information, in step 505. Thereafter, in step 507, the terminal may transmit the generated data frame and the stored SAD information.

In addition, if it is determined in step 503 that Ra is different from RaSAD, the terminal may wait until the time indicated by EtsSAD (i.e., information indicating an end time of a transaction process for a data frame to be transmitted next) included in duration information in the SAD information, in step 509. Thereafter, in step 507, the terminal may transmit the generated data frame and the stored SAD information.

In contrast, if it is determined in step 501 that SAD information is not stored, the terminal may determine in step 511 whether the number nTXQueue of data frames currently stored in the queue is equal to 1, to determine whether one data frame is currently stored in the queue. If it is determined in step 511 that nTXQueue is equal to 1 (i.e., one data frame is currently stored in the queue), the terminal may transmit the stored data frame in step 515.

However, if it is determined in step 511 that nTXQueue is not equal to 1 but is greater than 1 (i.e., two or more data frames are currently stored in the queue), the terminal may transmit the generated data frame and the stored SAD information in step 507.

With reference to FIG. 5, an operation of transmitting the data frame and the SAD information together is described above. The SAD information may be located in front, or at the rear, of a data frame depending on the implementation thereof. In the following description, an example of changing an operation mode by a terminal according to the implementation of the SAD information is described in more detail with reference to FIGS. 6 to 9.

Figure 6:
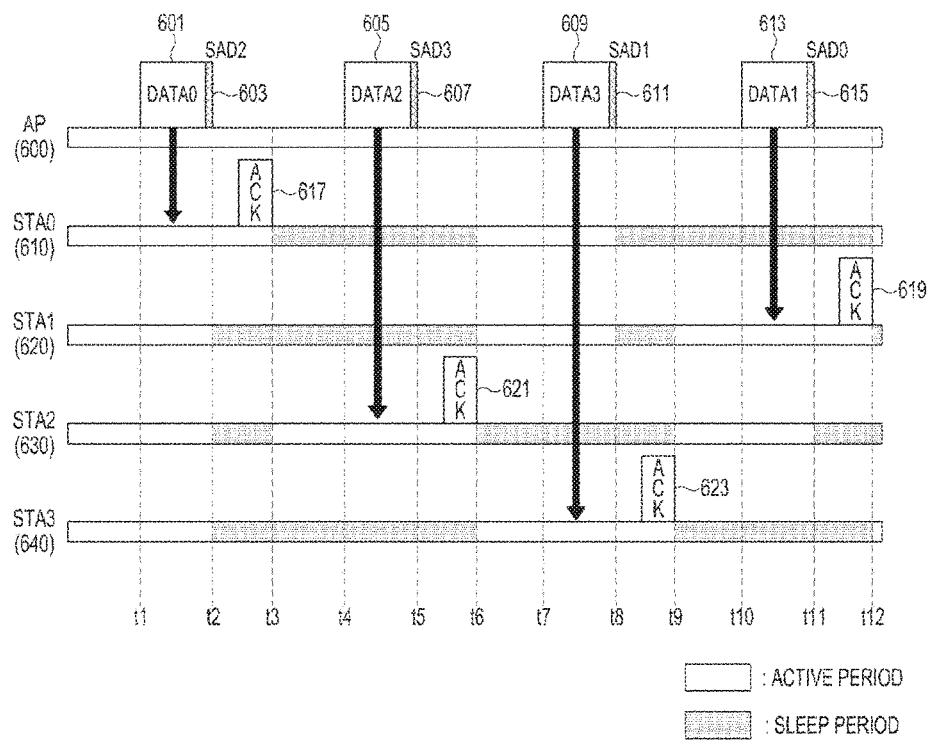
FIG. 6 illustrates an example of transmitting a data frame and SAD information to terminals by an access point in a power save mode according to an embodiment of the present disclosure.

FIG. 6 illustrates an example of transmitting a data frame and SAD information to terminals by an access point in a power save mode according to an embodiment of the present disclosure.

Particularly, with reference to FIG. 6, a description is provided below of an example of an active period and a sleep period of a terminal based on transmission of SAD information in a case where the SAD information is located at the rear of (or behind) a data frame. Hereinafter, for convenience of description, a data frame to be transmitted to an n-th terminal will be indicated by DATAn, and SAD information related to a data frame to be transmitted to an n-th terminal will be indicated by SADn.

Referring to FIG. 6, an access point (AP) 600 may transmit DATA0 601 and SAD information (e.g. SAD2 603) related to DATA2 605, that is the next data frame, to a terminal #0 (or STA0 610) at a time t1. The STA0 610 may transmit an acknowledgement (ACK) frame 617 to the AP 600 at a time t3 that the transaction process for the DATA0 601 is completed. SAD2 603 located at the rear of the DATA0 601 may be transmitted at a time t2, and at the time t2, terminals (e.g. a terminal #1 (or STA1 620) to a terminal #3 (or STA3 640)), which do not receive the DATA0 601, may change their operation modes from the active mode to the sleep mode.

The SAD2 603 may include information related to the DATA2 605 that is a data frame to be transmitted next, and each of the STA1 620 to the STA3 640 may determine a period (i.e., a sleep period) in which the terminal operates in the sleep mode, based on the duration information included in the SAD2 603.

In other words, the STA1 620 and the STA3 640, which are irrelevant to the transmission of the DATA2 605, may operate in the sleep mode from the time t2 until the time indicated by EtsSAD in the duration information included in the SAD2 603. The EtsSAD indicates an end time of a transaction process for the DATA2 605, and it will be assumed herein that the end time of a transaction process for the DATA2 605 is a time t6. Therefore, the STA1 620 and the STA3 640 may operate in the sleep mode from the time t2 that the SAD2 603 is transmitted until the time t6 indicated by EtsSAD.

In addition, the terminal #2 (or STA2 630), which is related to the transmission of the DATA2 605, may operate in the sleep mode from the time t2 until the time indicated by StsSAD in the duration information included in the SAD2 603. The StsSAD indicates a start time of a transaction process for the DATA2 605, and it will be assumed herein that the time indicated by StsSAD is a time t3. Therefore, the STA2 630 may operate in the sleep mode from the time t2 that the SAD2 603 is transmitted until the time t3 indicated by StsSAD.

In contrast, the STA0 610 that has completed the reception of the DATA0 601 may operate in the sleep mode from the time t3 that the STA0 610 transmitted the ACK frame 617 until the time t6 which is a time indicated by EtsSAD in the SAD2 603.

The AP 600 may transmit the DATA2 605 and SAD information (e.g. SAD3 607) related to DATA3 609 that is the next data frame to the STA2 630 at a time t4, and the STA2 630 may transmit an ACK frame 621 to the AP 600 at the time t6 that the transaction process for the DATA2 605 is completed. At the time t4 that the DATA2 605 is transmitted, the STA0 610, the STA1 620 and the STA3 640 may perform no operation, since their operation modes are the sleep mode. In addition, the STA2 630 may change its operation mode from the active mode to the sleep mode at the time t6 that the STA2 630 has completed the transaction process for the DATA2 605.

The SAD3 607 may include information related to the DATA3 609 that is a data frame to be transmitted next, and the STA2 630 may determine the sleep period based on the duration information included in the SAD3 607. In other words, the STA2 630 may operate in the sleep mode from the time t6 until an end time (e.g., a time t9) of a transaction process for the DATA3 609.

The AP 600 may transmit the DATA3 609 and SAD information (e.g. SAD1 611) related to DATA1 613 that is the next data frame to the STA3 640 at a time t7, and the STA3 640 may transmit an ACK frame 623 to the AP 600 at the time t9 that the transaction process for the DATA3 609 is completed. The SAD1 611 located at the rear of the DATA3 609 may be transmitted at a time t8, and at the time t8, the terminals (e.g. the STA0 610 and the STA1 620), which don't receive the DATA3 609, may change their operation modes from the active mode to the sleep mode. At the time t7 that the DATA3 609 is transmitted, the STA2 630 may perform no operation, since its operation mode is the sleep mode.

The SAD1 611 may include information related to the DATA1 613 that is a data frame to be transmitted next, and each of the STA0 610 and the STA1 620 may determine a sleep period based on the duration information included in the SAD1 611.

In other words, the STA0 610 which is irrelevant to the transmission of the DATA1 613 may operate in the sleep mode from the time t8 until the time indicated by EtsSAD in the duration information included in the SAD1 611. The EtsSAD indicates an end time of a transaction process for the DATA1 613, and it will be assumed herein that the end time of a transaction process for the DATA1 613 is a time t12. Therefore, the STA0 610 may operate in the sleep mode from the time t8 that the SAD1 611 is transmitted, until the time t12 indicated by EtsSAD.

In addition, the STA1 620, which is related to the transmission of the DATA1 613, may operate in the sleep mode from the time t8 until the time indicated by StsSAD in the duration information included in the SAD1 611. The StsSAD indicates a start time of a transaction process for the DATA1 613, and it will be assumed herein that the start time of a transaction process for the DATA1 613 is a time t9. Therefore, the STA1 620 may operate in the sleep mode from the time t8 that the SAD1 611 is transmitted, until the time t9 indicated by StsSAD.

In contrast, the STA3 640 that has completed the reception of the DATA3 609 may operate in the sleep mode from the time t9 that the STA3 640 transmitted the ACK frame 623 until the end time (e.g. the time t12 indicated by EtsSAD in the SAD1 611) of a transaction process for the DATA1 613.

The AP 600 may transmit the DATA1 613 and SAD information (e.g. SAD0 615) related to DATA5 that is the next data frame, to the STA1 620 at a time t10, and the STA1 620 may transmit an ACK frame 619 to the AP 600 at the time t12 that the transaction process for the DATA1 613 is completed. At the time t10 that the DATA1 613 is transmitted, the STA0 610 and the STA3 640 may perform no operation, since their operation modes are the sleep mode. In addition, the STA1 620 may change its operation mode from the active mode to the sleep mode at the time t12 that the STA1 620 has completed the transaction process for the DATA1 613.

Figure 7:
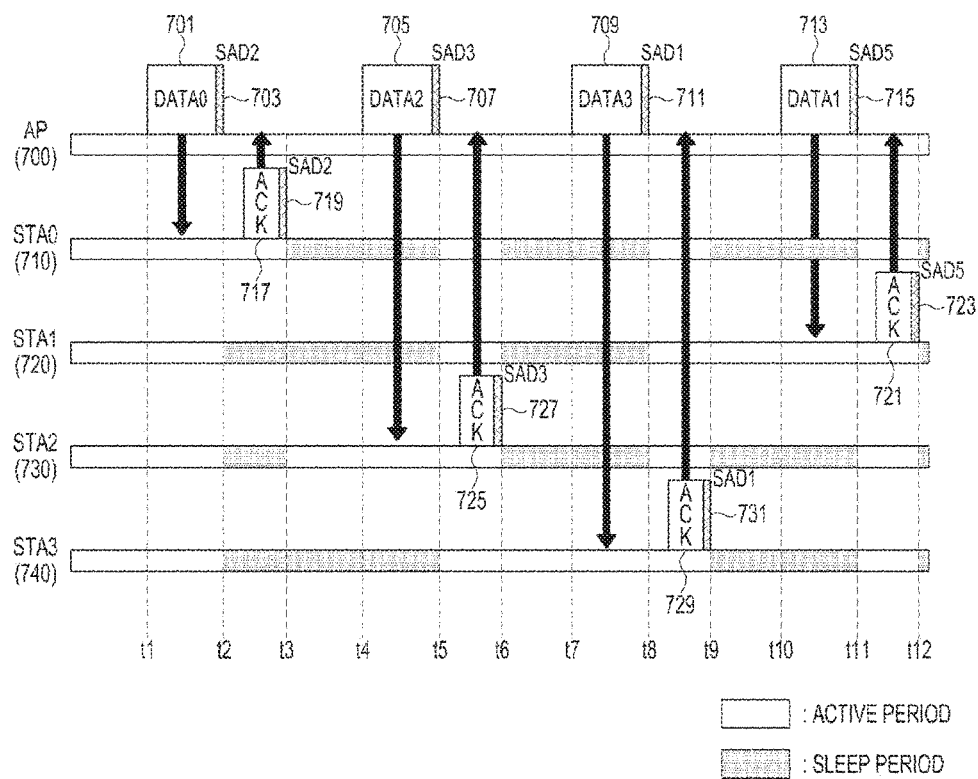
FIG. 7 illustrates an example of transmitting a data frame and SAD information to terminals by an access point in a power save mode according to an embodiment of the present disclosure.

FIG. 7 illustrates an example of transmitting a data frame and SAD information to terminals by an access point in a power save mode according to an embodiment of the present disclosure.

Particularly, with reference to FIG. 7, a description is provided below of an example of an active period and a sleep period of a terminal based on transmission of SAD information in a case where the SAD information is located at the rear of each of a data frame and an ACK frame.

Referring to FIG. 7, an AP 700 may transmit DATA0 701 and SAD information (e.g. a first SAD2 703) related to DATA2 705 that is the next data frame to STA0 710 at a time t1, and the STA0 710 may transmit an ACK frame 717 and a second SAD2 719 to the AP 700 at a time t3 that the transaction process for the DATA0 701 is completed. The first SAD2 703 located at the rear of the DATA0 701 may be transmitted at a time t2, and at the time t2, terminals (e.g. STA1 720 to STA3 740), which don't receive the DATA0 701, may change their operation modes from the active mode to the sleep mode. The second SAD2 719 may be the same information as the first SAD2 703, or may be information that is updated from the first SAD2 703.

The first SAD2 703 may include information related to the DATA2 705 that is a data frame to be transmitted next, and each of the STA1 720 to the STA3 740 may determine a sleep period based on the duration information included in the first SAD2 703.

In other words, the STA1 720 and the STA3 740, which are irrelevant to the transmission of the DATA2 705, may operate in the sleep mode from the time t2 until the time indicated by EtsSAD in the duration information included in the first SAD2 703. The EtsSAD indicates an end time of a transaction process for the DATA2 705, and it will be assumed herein that the end time of a transaction process for the DATA2 705 is a time t5. Therefore, the STA1 720 and the STA3 740 may operate in the sleep mode from the time t2 that the first SAD2 703 is transmitted, until the time t5 indicated by EtsSAD.

In addition, the STA2 730, which is related to the transmission of the DATA2 705, may operate in the sleep mode from the time t2 until the time indicated by StsSAD in the duration information included in the first SAD2 703. The StsSAD indicates a start time of a transaction process for the DATA2 705, and it will be assumed herein that the time indicated by StsSAD is a time t3. Therefore, the STA2 730 may operate in the sleep mode from the time t2 that the first SAD2 703 is transmitted until the time t3 indicated by StsSAD.

In contrast, the STA0 710 that has completed the reception of the DATA0 701 may operate in the sleep mode from the time t3 that the STA0 710 transmitted the ACK frame 717 until the time t5 which is a time indicated by EtsSAD in the first SAD2 703.

The AP 700 may transmit the DATA2 705 and SAD information (e.g. the first SAD3 707) related to DATA3 709 that is the next data frame, to the STA2 730 at a time t4, and the STA2 730 may transmit an ACK frame 725 and a second SAD3 727 to the AP 700 at the time t6 that the transaction process for the DATA2 705 is completed. At the time t4 that the DATA2 705 is transmitted, the STA0 710, the STA1 720 and the STA3 740 may perform no operation, since their operation modes are the sleep mode.

However, among the STA0 710, the STA1 720 and the STA3 740 that have changed their operation modes to the active mode at the time t5, the terminals (e.g. STA0 710 and the STA1 720), which are irrelevant to the transmission of the DATA3 709, may change their operation modes from the active mode to the sleep mode at the time t6 that the second SAD3 727 is transmitted. The STA2 730 that has completed the reception of the DATA2 705 may also change its operation mode to the sleep mode at the time t6.

The second SAD3 727 may include information related to the DATA3 709 that is a data frame to be transmitted next, and each of the STA0 710 to the STA2 730 may determine a sleep period based on the duration information included in the second SAD3 727.

In other words, each of the STA0 710 to the STA2 730, which are irrelevant to the transmission of the DATA3 709, may operate in the sleep mode from the time t6 until the time indicated by EtsSAD in the duration information included in the second SAD3 727. The EtsSAD indicates an end time of a transaction process for the DATA3 709, and it will be assumed herein that the end time of a transaction process for the DATA3 709 is a time t8. Therefore, each of the STA0 710 to the STA2 730 may operate in the sleep mode from the time t6 that the second SAD3 727 is transmitted until the time t8 which is a time indicated by EtsSAD.

In contrast, the STA3 740 that has changed its operation mode to the active mode at the time t5 may keep the active mode which is the current operation mode, determining that the second SAD3 727 is SAD information related to the data frame that is to be transmitted to the STA3 740.

The AP 700 may transmit the DATA3 709 and SAD information (e.g. a first SAD1 711) related to DATA1 713 that is the next data frame to the STA3 740 at a time t7, and the STA3 740 may transmit an ACK frame 729 and a second SAD1 731 to the AP 700 at a time t9 that the transaction process for the DATA3 709 is completed. At the time t7 that the DATA3 709 is transmitted, the STA0 710 to the STA2 730 may perform no operation, since their operation modes are the sleep mode.

However, among the STA0 710 to the STA2 730 that have changed their operation modes to the active mode at the time t8, the STA0 710 and the STA2 730 may change their operation modes from the active mode to the sleep mode at the time t9 that the second SAD1 731 is transmitted. The STA3 740 that has completed the reception of the DATA3 709 may also change its operation mode to the sleep mode at the time t9.

The second SAD1 731 may include information related to the DATA1 713 that is a data frame to be transmitted next, and each of the STA0 710, the STA2 730 and the STA3 740 may determine a sleep period based on the duration information included in the second SAD1 731.

In other words, each of the STA0 710, the STA2 730 and the STA3 740, which are irrelevant to the transmission of the DATA1 713 may operate in the sleep mode from the time t9 until the time indicated by EtsSAD in the duration information included in the second SAD1 731. The EtsSAD indicates an end time of a transaction process for the DATA1 713, and it will be assumed herein that the end time of a transaction process for the DATA1 713 is a time t11. Therefore, each of the STA0 710, the STA2 730 and the STA3 740 may operate in the sleep mode from the time t9 that the second SAD1 731 is transmitted, until the time t11, which is a time indicated by EtsSAD.

In contrast, the STA1 720 that has changed its operation mode to the active mode at the time t8 may keep the active mode which is the current operation mode, determining that the second SAD1 731 is SAD information related to the data frame that is to be transmitted to the STA1 720.

The AP 700 may transmit the DATA1 713 and SAD information (e.g. a first SAD5 715) related to DATA5 that is the next data frame to the STA1 720 at a time t10, and the STA1 720 may transmit an ACK frame 721 and a second SAD5 723 to the AP 700 at a time t12 that the transaction process for the DATA1 713 is completed. At the time t10 that the DATA1 713 is transmitted, the STA0 710, the STA2 730 and the STA3 740 may perform no operation, since their operation modes are the sleep mode.

However, the STA0 710, the STA2 730 and the STA3 740 that have changed their operation modes to the active mode at the time t11 may change their operation modes from the active mode to the sleep mode at the time t12 that the second SAD5 723 is transmitted. The STA1 720 that has completed the reception of the DATA1 713 may change its operation mode to the sleep mode at the time t12.

Figure 8:
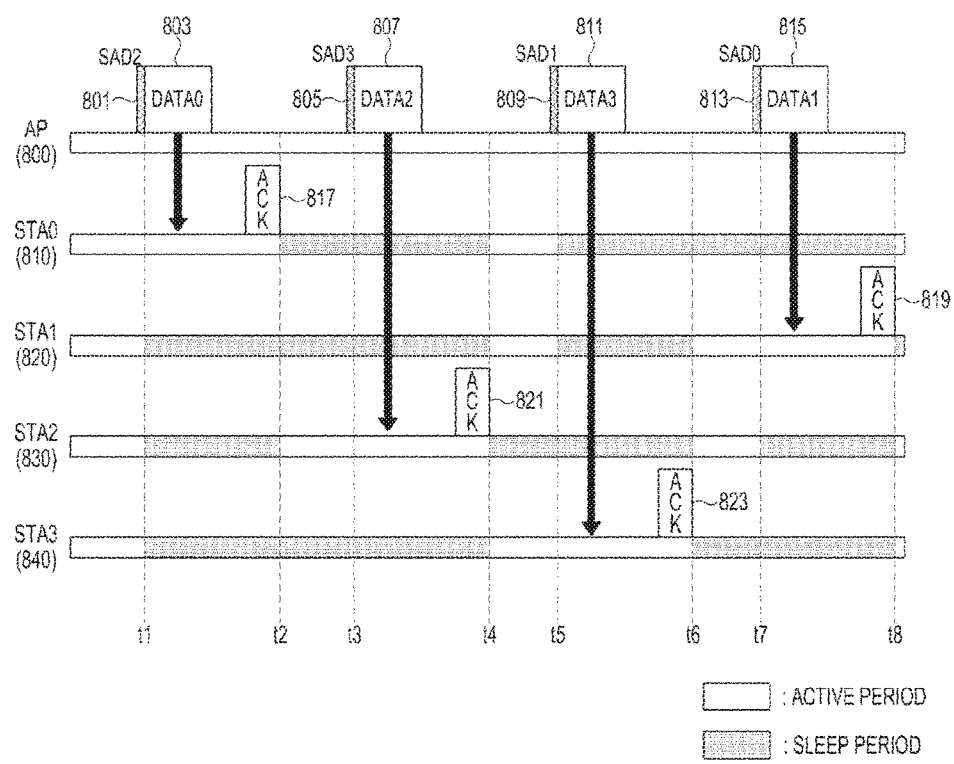
FIG. 8 illustrates an example of transmitting a data frame and SAD information to terminals by an access point in a power save mode according to an embodiment of the present disclosure.

FIG. 8 illustrates an example of transmitting a data frame and SAD information to terminals by an access point in a power save mode according to another embodiment of the present disclosure.

Particularly, with reference to FIG. 8, a description is provided below of an example of an active period and a sleep period of a terminal based on transmission of SAD information in a case where the SAD information is located in front of a data frame.

Referring to FIG. 8, an AP 800 may transmit SAD information (e.g. SAD2 801) related to DATA2 807 that is the next data frame, and DATA0 803 to STA0 810 at a time t1, and the STA0 810 may transmit an ACK frame 817 to the AP 800 at a time t2 that the transaction process for the DATA0 803 is completed. In this case, at the time t1 that the SAD2 801 located in front of the DATA0 803 is transmitted, terminals (e.g., STA1 820 to STA3 840), which don't receive the DATA0 803, may change their operation modes from the active mode to the sleep mode.

The SAD2 801 may include information related to the DATA2 807 that is a data frame to be transmitted next, and each of the STA1 820 to the STA3 840 may determine a sleep period based on the duration information included in the SAD2 801.

In other words, the STA1 820 and the STA3 840, which are irrelevant to the transmission of the DATA2 807, may operate in the sleep mode from the time t1 until the time indicated by EtsSAD in the duration information included in the SAD2 801. The EtsSAD indicates an end time of a transaction process for the DATA2 807, and it will be assumed herein that end time of a transaction process for the DATA2 807 is a time t4. Therefore, the STA1 820 and the STA3 840 may operate in the sleep mode from the time t1 that the SAD2 801 is transmitted, until the time t4 indicated by EtsSAD.

In addition, the STA2 830, which is related to the transmission of the DATA2 807, may operate in the sleep mode from the time t1 until the time indicated by StsSAD in the duration information included in the SAD2 801. The StsSAD indicates a start time of a transaction process for the DATA2 807, and it will be assumed herein that the time indicated by StsSAD is a time t2. Therefore, the STA2 830 may operate in the sleep mode from the time t1 that the SAD2 801 is transmitted, until the time t2 indicated by the StsSAD.

In contrast, the STA0 810 that has completed the reception of the DATA0 803 may operate in the sleep mode from the time t2 that the STA0 810 transmitted the ACK frame 817 until the time t4 which is a time indicated by EtsSAD in the SAD2 801.

The AP 800 may transmit SAD information (e.g. SAD3 805) related to DATA3 811 that is the next data frame, and DATA2 807 to the STA2 830 at a time t3, and the STA2 830 may transmit an ACK frame 821 to the AP 800 at a time t4 that the transaction process for the DATA2 807 is completed. At the time t3 that the DATA2 807 is transmitted, the STA0 810, the STA1 820 and the STA3 840 may perform no operation, since their operation modes are the sleep mode. In addition, the STA2 830 may change its operation mode from the active mode to the sleep mode at the time t4 that the STA2 830 has completed the transaction process for the DATA2 807.

The SAD3 805 may include information related to the DATA3 811 that is a data frame to be transmitted next, and the STA2 830 may determine a sleep period based on the duration information included in the SAD3 805. In other words, the STA2 830 may operate in the sleep mode from the time t4 until the end time (e.g. a time t6) of a transaction process for the DATA3 811.

The AP 800 may transmit SAD information (e.g. SAD1 809) related to DATA1 815 that is the next data frame, and the DATA3 811 to the STA3 840 at a time t5, and the STA3 840 may transmit an ACK frame 823 to the AP 800 at the time t6 that the transaction process for the DATA3 811 is completed. In this case, the SAD1 809 located in front of the DATA3 811 may be transmitted at the time t5, and at the time t5, the terminals (i.e., the STA0 810 and the STA1 820), which don't receive the DATA3 811, may change their operation modes from the active mode to the sleep mode. At the time t5 that the DATA3 811 is transmitted, the STA2 830 may perform no operation, since its operation mode is the sleep mode.

The SAD1 809 may include information related to the DATA1 815 that is a data frame to be transmitted next, and each of the STA0 810 and the STA1 820 may determine a sleep period based on the duration information included in the SAD1 809.

In other words, the STA0 810, which is irrelevant to the transmission of the DATA1 815, may operate in the sleep mode from the time t5 until the time indicated by EtsSAD in the duration information included in the SAD1 809. The EtsSAD indicates an end time of a transaction process for the DATA1 815, and it will be assumed herein that the end time of a transaction process for the DATA1 815 is a time t8. Therefore, the STA0 810 may operate in the sleep mode from the time t5 that the SAD1 809 is transmitted, until the time t8 indicated by EtsSAD.

In addition, the STA1 820, which is related to the transmission of the DATA1 815, may operate in the sleep mode from the time t5 until the time indicated by StsSAD in the duration information included in the SAD1 809. The StsSAD indicates a start time of a transaction process for the DATA1 815, and it will be assumed herein that the start time of a transaction process for the DATA1 815 is the time t6. Therefore, the STA1 820 may operate in the sleep mode from the time t5 that the SAD1 809 is transmitted, until the time t6 indicated by StsSAD.

In contrast, the STA3 840 that has completed the reception of the DATA3 811 may operate in the sleep mode from the time t6 that the STA3 840 transmitted the ACK frame 823, until the end time (e.g. the time t8 indicated by EtsSAD in the SAD1 809) of a transaction process for the DATA1 815.

The AP 800 may transmit SAD information (e.g. SAD0 813) related to DATA5 that is the next data frame, and the DATA1 815 to the STA1 820 at a time t7, and the STA1 820 may transmit an ACK frame 819 to the AP 800 at the time t8 that the transaction process for the DATA1 815 is completed. In this case, at the time t7 that the SAD0 813 located in front of the DATA1 815 is transmitted, the terminal (e.g. the STA2 830) whose operation mode is the active mode, among the terminals which don't receive the DATA1 815, may change its operation mode to the sleep mode. In addition, at the time t7 that the DATA1 815 is transmitted, the terminals (e.g., the STA0 810 and the STA3 840) whose operation modes are the sleep mode may perform no operation. Further, the STA1 820 may change its operation mode from the active mode to the sleep mode at the time t8 that the STA1 820 has completed the transaction process for the DATA1 815.

Figure 9:
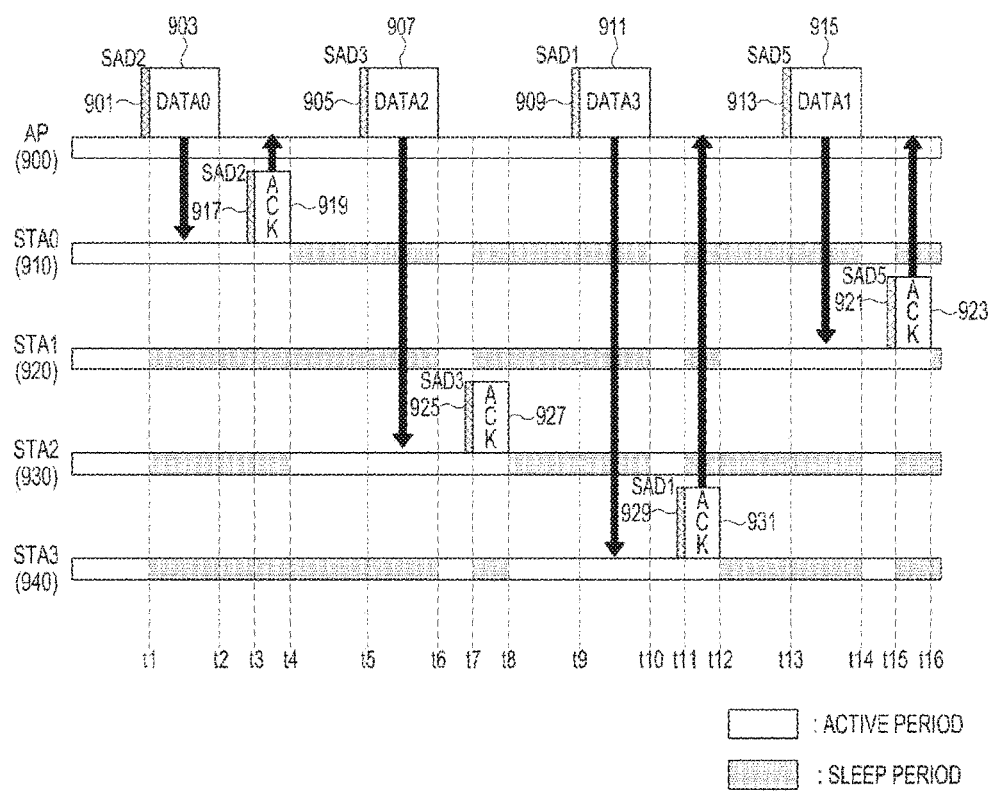
FIG. 9 illustrates an example of transmitting a data frame and SAD information to terminals by an access point in a power save mode according to an embodiment of the present disclosure.

FIG. 9 illustrates an example of transmitting a data frame and SAD information to terminals by an access point in a power save mode according to an embodiment of the present disclosure.

Particularly, with reference to FIG. 9, a description is provided below of an example of an active period and a sleep period of a terminal based on transmission of SAD information in a case where the SAD information is located in front of each of a data frame and an ACK frame.

Referring to FIG. 9, an AP 900 may transmit SAD information (e.g. a first SAD2 901) related to DATA2 907 that is the next data frame, and DATA0 903 to STA0 910 at a time t1. The STA0 910 may transmit a second SAD2 917 and an ACK frame 919 to the AP 900 at a time t3 that the transaction process for the DATA0 903 is completed. In this case, at the time t1 that the first SAD2 901 located in front of the DATA0 903 is transmitted, terminals (e.g., STA1 920 to STA3 940), which don't receive the DATA0 903, may change their operation modes from the active mode to the sleep mode. The second SAD2 917 may be the same information as the first SAD2 901, or may be information that is updated from the first SAD2 901.

The first SAD2 901 may include information related to the DATA2 907 that is a data frame to be transmitted next, and each of the STA1 920 to the STA3 940 may determine a sleep period based on the duration information included in the first SAD2 901.

In other words, the STA1 920 and the STA3 940, which are irrelevant to the transmission of the DATA2 907, may operate in the sleep mode from the time t1 until the time indicated by EtsSAD in the duration information included in the first SAD2 901. The EtsSAD indicates an end time of a transaction process for the DATA2 907, and it will be assumed herein that the end time of a transaction process for the DATA2 907 is a time t6. Therefore, the STA1 920 and the STA3 940 may operate in the sleep mode from the time t1 that the first SAD2 901 is transmitted, until the time t6 indicated by EtsSAD.

In addition, the STA2 930, which is related to the transmission of the DATA2 907, may operate in the sleep mode from the time t1 until the time indicated by StsSAD in the duration information included in the first SAD2 901. The StsSAD indicates a start time of a transaction process for the DATA2 907, and it will be assumed herein that the time indicated by StsSAD is a time t4. Therefore, the STA2 930 may operate in the sleep mode from the time t1 that the first SAD2 901 is transmitted, until the time t4 indicated by StsSAD.

In contrast, the STA0 910 that has completed the reception of the DATA0 903 may operate in the sleep mode from the time t4 that the STA0 910 transmitted the ACK frame 919, until the time t6 which is a time indicated by EtsSAD in the first SAD2 901.

The AP 900 may transmit SAD information (e.g. a first SAD3 905) related to DATA3 911 that is the next data frame, and the DATA2 907 to the STA2 930 at a time t5. The STA2 930 may transmit a second SAD3 925 and an ACK frame 927 to the AP 900 at the time t7 that the transaction process for the DATA2 907 is completed. At the time t5 that the DATA2 907 is transmitted, the STA0 910, the STA1 920 and the STA3 940 may perform no operation, since their operation modes are the sleep mode.

However, among the STA0 910, the STA1 920 and the STA3 940 that have changed their operation modes to the active mode at the time t6, the terminals (e.g., STA0 910 and the STA1 920), which are irrelevant to the transmission of the DATA3 911, may change their operation modes from the active mode to the sleep mode at the time t7 that the second SAD3 925 is transmitted. The STA2 930 that has completed the reception of the DATA2 907 may also change its operation mode to the sleep mode at a time t8 that the ACK frame 927 is transmitted.

The second SAD3 925 may include information related to the DATA3 911 that is a data frame to be transmitted next, and each of the STA0 910 to the STA2 930 may determine a sleep period based on the duration information included in the second SAD3 925.

In other words, each of the STA0 910 to the STA2 930, which are irrelevant to the transmission of the DATA3 911, may operate in the sleep mode until the time indicated by EtsSAD in the duration information included in the second SAD3 925. The EtsSAD indicates an end time of a transaction process for the DATA3 911, and it will be assumed herein that the end time of a transaction process for the DATA3 911 is a time t10. Therefore, the STA0 910 and the STA1 920 may operate in the sleep mode from the time t7 that the second SAD3 925 is transmitted until the time t10 which is a time indicated by EtsSAD, and the STA2 930 may operate in the sleep mode from the time t8 that the ACK frame 927 is transmitted until the time t10 which is a time indicated by EtsSAD.

The AP 900 may transmit SAD information (e.g. a first SAD1 909) related to DATA1 915 that is the next data frame, and the DATA3 911 to the STA3 940 at a time t9. The STA3 940 may transmit a second SAD1 929 and an ACK frame 931 to the AP 900 at a time t11 that the transaction process for the DATA3 911 is completed. At the time t9 that the DATA3 911 is transmitted, the STA0 910 to the STA2 930 may perform no operation, since their operation modes are the sleep mode.

However, the STA0 910 to the STA2 930 that have changed their operation modes to the active mode at the time t10 may change their operation modes to the sleep mode at the time t11 that the second SAD1 929 is transmitted. The STA3 940 that has completed the reception of the DATA3 911 may also change its operation mode to the sleep mode at a time t12 that the transmission of the ACK frame 931 is completed.

The second SAD1 929 may include information related to the DATA1 915 that is a data frame to be transmitted next, and each of the STA0 910 to the STA3 940 may determine a sleep period based on the duration information included in the second SAD1 929.

In other words, each of the STA0 910, the STA2 930 and the STA3 940, which are irrelevant to the transmission of the DATA1 915, may operate in the sleep mode until the time indicated by EtsSAD in the duration information included in the second SAD1 929. The EtsSAD indicates an end time of a transaction process for the DATA1 915, and it will be assumed herein that the end time of a transaction process for the DATA1 915 is a time t14. Therefore, the STA0 910 and the STA2 930 may operate in the sleep mode from the time t11 that the second SAD1 929 is transmitted until the time t14 which is a time indicated by EtsSAD, and the STA3 940 may operate in the sleep mode from the time t12 that the transmission of the ACK frame 931 is completed until the time t14 which is a time indicated by EtsSAD.

In contrast, the STA1 920, which is related to the transmission of the DATA1 915, may operate in the sleep mode from the time t11 until the time indicated by StsSAD in the duration information included in the second SAD1 929. The StsSAD indicates a start time of a transaction process for the DATA1 915, and it will be assumed herein that the start time of a transaction process for the DATA1 915 is a time t12. Therefore, the STA1 920 may operate in the sleep mode from the time t11 that the second SAD1 929 is transmitted until the time t12 which is a time indicated by StsSAD.

The AP 900 may transmit SAD information (e.g. a first SAD5 913) related to DATA5 that is the next data frame, and the DATA1 915 to the STA1 920 at a time t13. The STA1 920 may transmit a second SAD5 921 and an ACK frame 923 to the AP 900 at a time t15 that the transaction process for the DATA1 915 is completed. At the time t13 that the DATA1 915 is transmitted, the STA0 910, the STA2 930 and the STA3 940 may perform no operation, since their operation modes are the sleep mode.

However, the STA0 910, the STA2 930 and the STA3 940 that have changed their operation modes to the active mode at the time t14 may change their operation modes from the active mode to the sleep mode at the time t15 that the second SAD5 921 is transmitted. The STA1 920 that has completed the reception of the DATA1 915 may change its operation mode to the sleep mode at the time t16 that the transmission of the ACK frame 923 is completed.

In FIGS. 6 to 9, SAD information is concatenated to a data frame to be located in front, or at the rear, of the data frame. In an embodiment of the present disclosure, however, the SAD information may be located apart from the data frame by a predetermined distance without being concatenated to the data frame. In other words, the SAD information may be located in front, or at the rear, of the data frame so as to be spaced apart from the data frame by a predetermined distance.

Figure 10:
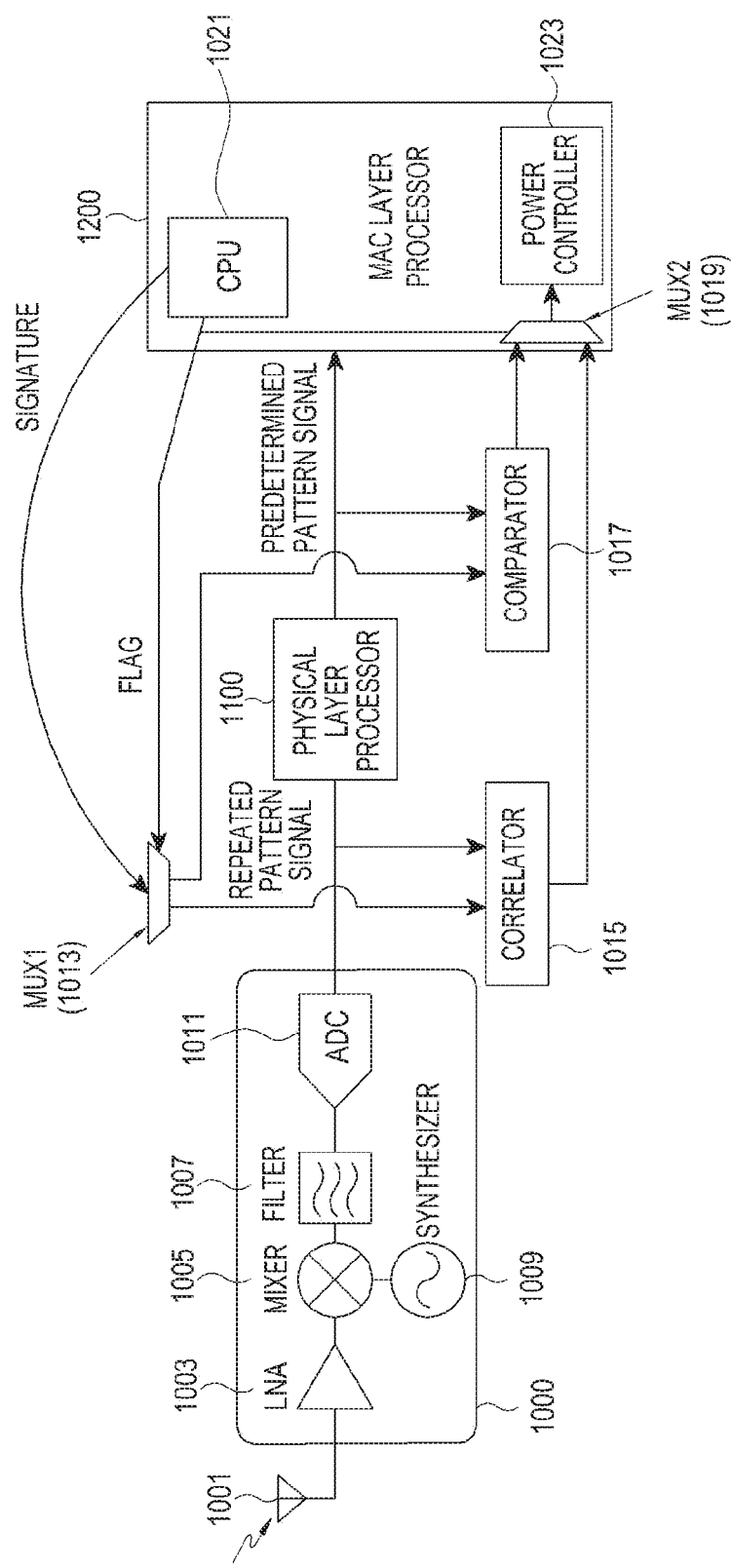
FIG. 10 is a block diagram of a terminal in a power save mode according to an embodiment of the present disclosure.

FIG. 10 is a block diagram of a terminal in a power save mode according to an embodiment of the present disclosure.

Referring to FIG. 10, the terminal may include a reception processor 1000, a physical layer processor 1100, a MAC layer processor 1200, a first multiplexer (MUX1) 1013, a correlator 1015, a comparator 1017, and an antenna 1001. In addition, the reception processor 1000 may include a low-noise amplifier (LNA) 1003, a mixer 1005, a synthesizer 1009, a filter 1007, and an analog to digital converter (ADC) 1011, and the MAC layer processor 1200 may include a central processing unit (CPU) 1021, a second multiplexer (MUX2) 1019, and a power controller 1023.

A signal received by the antenna 1001 may be output to the physical layer processor 1100 after undergoing reception processing. In other words, the received signal may be input to the LNA 1003, and the LNA 1003 may amplify the input signal and output the amplified signal to the mixer 1005. The mixer 1005 may receive the signal output from the LNA 1003 and the signal output from the synthesizer 1009, mix the two signals, and then output the mixed signal to the filter 1007. The filter 1007 may filter the signal output from the mixer 1005 and output the filtered signal to the ADC 1011. The ADC 1011 may convert the analog signal output from the filter 1007 into a digital signal and output the digital signal to the physical layer processor 1100.

The digital signal output from the ADC 1011 may undergo physical layer processing by the physical layer processor 1100, and then may be output to the MAC layer processor 1200.

Upon receiving the signal that has undergone physical layer processing, the CPU 1021 of the MAC layer processor 1200 may detect signature information by acquiring SAD information from the received signal. Thereafter, the CPU 1021 may output the detected signature information to the first multiplexer 1013. If the signature information is located in front of a PPDU frame, the signature information may be used for channel detection, and if the signature information is located at the rear of a PPDU frame, the signature information may be used as a flag indicating an input of SAD information. Therefore, if the signature information is located in front of a PPDU frame, the first multiplexer 1013 may output a signal of a repeated pattern, like a normal preamble, to the correlator 1015, and if the signature information is located at the rear of a PPDU frame, the first multiplexer 1013 may output a signal of a predetermined pattern to the comparator 1017.

The correlator 1015 may perform correlation processing on the repeated-pattern signal output from the first multiplexer 1013 and the signal output from the ADC 1011, and output the correlation-processed signal to the second multiplexer 1019. The correlation processing operation of the correlator 1015 is described below in detail with reference to FIG. 11A.

The comparator 1017 may perform comparison processing on the predetermined pattern signal output from the first multiplexer 1013 and the signal output from the physical layer processor 1100, and output the comparison-processed signal to the second multiplexer 1019. The comparison processing operation of the comparator 1017 is described below in detail with reference to FIG. 11B.

The second multiplexer 1019 may receive the signal output from the correlator 1015 or the signal output from the comparator 1017, and output the received signal to the power controller 1023, and the power controller 1023 may control the power of the terminal based on the input signal.

Figure 11A:
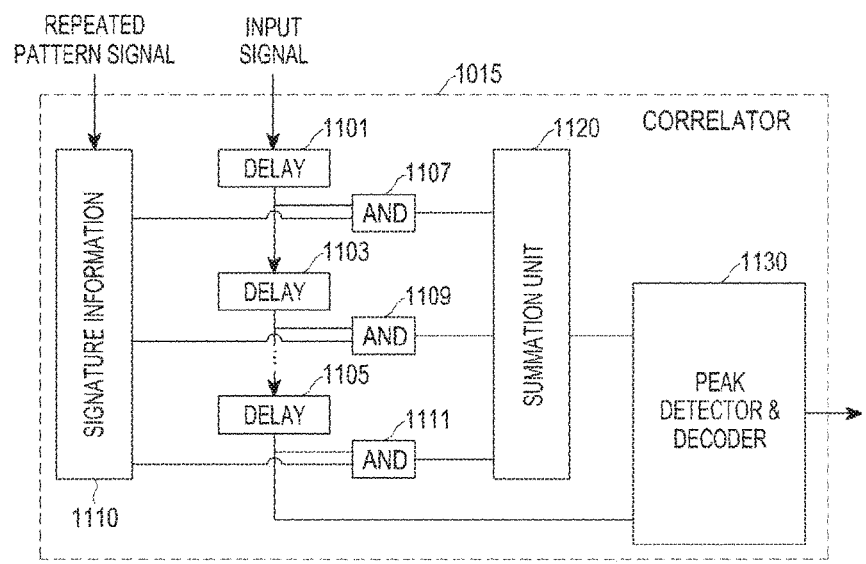
FIG. 11A is a block diagram of a correlator of a terminal in a power save mode according to an embodiment of the present disclosure.

FIG. 11A is a block diagram of a correlator 1015 of a terminal in a power save mode according to an embodiment of the present disclosure.

Referring to FIG. 11A, the correlator 1015 of the terminal may include delays 1101, 1103 and 1105, AND gates 1107, 1109 and 1111, a summation unit 1120, and a peak detector & decoder 1130.

The signal output from the ADC 1011 may be input to each of the delays 1101, 1103 and 1105, and each of the delays 1101, 1103 and 1105 may delay the input signal by a predetermined time.

The signature information 1110 (e.g., the signal of a repeated pattern) output from the first multiplexer 1013, and the signal output from each of the delays 1101, 1103 and 1105 may be input to associated AND gates 1107, 1109 and 1111, and each of the AND gates 1107, 1109 and 1111 may compute a logical product (or logical AND) of the two input signals.

The summation unit 1120 may receive logical products output from the AND gates 1107, 1109 and 1111, and sum the received logical product values.

The peak detector and decoder 1130 may detect a peak value by receiving the signal output from the delay 1105 and the signal output from the summation unit 1120, and detect address information and duration information of SAD information by decoding the detected peak value.

Figure 11B:
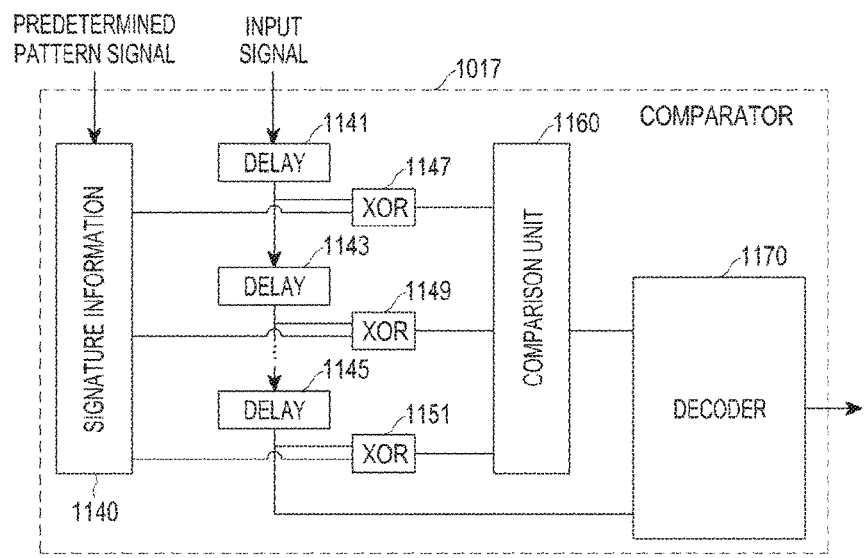
FIG. 11B is a block diagram of a comparator of a terminal in a power save mode according to an embodiment of the present disclosure.

FIG. 11B is a block diagram of a comparator 1017 of a terminal in a power save mode according to an embodiment of the present disclosure.

Referring to FIG. 11B, the comparator 1017 of the terminal may include delays 1141, 1143 and 1145, XOR gates 1147, 1149 and 1151, a comparison unit 1160, and a decoder 1170.

The signal output from the ADC 1011 may be input to each of the delays 1141, 1143 and 1145, and each of the delays 1141, 1143 and 1145 may delay the input signal by a predetermined time.

The signature information 1140 (e.g., the signal of a predetermined pattern) output from the first multiplexer 1013, and the signal output from each of the delays 1141, 1143 and 1145 may be input to associated XOR gates 1147, 1149 and 1151, and each of the XOR gates 1147, 1149 and 1151 may compute a logical exclusive-or (or logical XOR) of the two input signals.

The comparison unit 1160 may receive a logical exclusive-or output from each of the XOR gates 1147, 1149 and 1151, and compare each of the received logical exclusive-or values to logical zero (0).

The decoder 1170 may decode the signal output from the delay 1145 and the signal output from the comparison unit 1160, and detect address information and duration information of SAD information.

It will be appreciated that the power control apparatus and method according to an embodiment of the present disclosure may be implemented in the form of hardware, software or a combination thereof. Software may be stored in a volatile or nonvolatile storage device (e.g., an erasable/rewritable read only memory (ROM)), a memory (e.g., a random access memory (RAM), a memory integrated circuit (IC) or chip, or a memory device), or an optically or magnetically writable machine (e.g., a computer)-readable storage medium (e.g., a compact disk (CD), a digital versatile disk (DVD), a magnetic disk, or a magnetic tape). The power control apparatus and method may be implemented by a computer or a mobile terminal that includes a controller and a memory. It will be understood that the memory is an example of a non-transitory machine-readable storage medium suitable to store a program or programs including instructions for implementing embodiments of the present disclosure.

Therefore, the present disclosure may include a program including code for implementing an apparatus and a method as set forth in the appended claims, and a non-transitory machine (or computer)-readable storage medium for storing the program. In addition, the program may be electronically carried on any medium such as communication signals that are delivered through wired/wireless connections.

Further, in an embodiment of the present disclosure, the power control apparatus and method may receive and store the program from a program server. The program server may include a memory for storing a program including instructions for performing the power control method and also storing information necessary for the power control method, a communication unit for performing wired/wireless communication with the power control apparatus, and a controller for transmitting the program to the power control apparatus automatically or at the request of the power control apparatus.

As is apparent from the foregoing description, the power control apparatus and method may transmit additional information related to the next data frame together when transmitting a data frame, thereby making it possible to minimize the power consumed in the terminal, thus contributing to the superior power saving effects.

While the present disclosure has been shown and described with reference to certain embodiments thereof, it will be understood by those skilled in the art that various changes in form and details may be made therein without departing from the scope and spirit of the present disclosure as defined by the appended claims and their equivalents.

What is claimed is:

1. A terminal for controlling power, the terminal comprising:
   a receiver; and
   a controller configured to:
   receive, using the receiver, data including a data frame and first information of a next data frame of the data frame, wherein the first information includes a destination address information of the next data frame and duration information indicating a time during which a transmission of the next data frame occurs;
   determine an operation mode of the terminal as an active mode or a sleep mode based on whether a destination of the next data frame is the terminal by comparing the destination address information of the next data frame with a terminal's address, and the duration information of the next data frame,
   wherein the controller is further configured to identify whether the destination of the next data frame is the terminal based on the destination address information included in the first information, in response to identifying that the destination of the next data frame is the terminal, determine the operation mode of the terminal as the sleep mode until a start time of the transmission for the next data frame, and in response to identifying that the destination of the next data frame is not the terminal, determine the operation mode of the terminal as the sleep mode until an end time of the transmission for the next data frame.

2. The terminal of claim 1, wherein the first information further comprises signature information for determining whether the first information is located in front of the data frame or behind the data frame.

3. The terminal of claim 1, wherein when the terminal receives the next data frame, the controller is further configured to determine the operation mode as the sleep mode from a time that the first information was received until a start time of a transaction process for the next data frame.

4. The terminal of claim 1, wherein when the terminal does not receive the next data frame, the controller is further configured to determine the operation mode as the sleep mode from a time that the first information was received until an end time of a transaction process for the next data frame.

5. The terminal of claim 1, further comprising a transmitter configured to transmit a second information to an access point (AP) and an acknowledgement (ACK) frame for reception of the data frame, wherein the second information is an updated information based on the first information; and wherein when the terminal does not receive the next data frame, the controller is further configured to determine the operation mode as the sleep mode from a time that the ACK frame was transmitted until an end time of a transaction process for the next data frame.

6. A method of controlling power of a terminal, the method comprising:

receiving data including a data frame and first information of a next data frame of the data frame, wherein the first information includes a destination address information of the next data frame and duration information indicating a time during which a transmission of the next data frame occurs; and determining an operation mode of the terminal as an active mode or a sleep mode based on whether a destination of the next data frame is the terminal by comparing the destination address information of the next data frame with a terminal's address, and the duration information of the next data frame, wherein determining the operation mode of the terminal comprises:

identifying whether the destination of the next data frame is the terminal based on the destination address information included in the first information, in response to identifying that the destination of the next data frame is the terminal, determining the operation mode of the terminal as the sleep mode until a start time of the transmission for the next data frame, and in response to identifying that the destination of the next data frame is not the terminal, determining the operation mode of the terminal as the sleep mode until an end time of the transmission for the next data frame.

7. The method of claim 6, wherein the first information further comprises signature information for determining whether the first information is located in front of the data frame or behind the data frame.

8. The method of claim 6, further comprising when the terminal receives the next data frame, determining the operation mode as the sleep mode from a time that the first information was received until a start time of a transaction process for the next data frame.

9. The method of claim 6, further comprising when the terminal does not receive the next data frame, determining the operation mode as the sleep mode from a time that the first information was received until an end time of a transaction process for the next data frame.

10. The method of claim 6, further comprising transmitting a second information to an access point (AP) and an acknowledgement (ACK) frame for reception of the data frame, wherein the second information is an updated information based on the first information;

wherein when the terminal does not receive the next data frame, determining the operation mode comprises determining the operation mode as the sleep mode from a time that the ACK frame was transmitted until an end time of a transaction process for the next data frame.

11. A chipset for controlling power of a terminal, the chipset configured to:

receive data including a data frame and first information of a next data frame of the data frame, wherein the first information includes a destination address information of the next data frame and duration information indicating a time during which a transmission of the next data frame occurs; and determine an operation mode of the terminal as an active mode or a sleep mode based on whether a destination of the next data frame is the terminal by comparing the destination address information of the next data frame with a terminal's address, and duration information of the next data frame, wherein the chipset is further configured to identify whether the destination of the next data frame is the terminal based on the destination address information included in the first information, in response to identifying that the destination of the next data frame is the terminal, determine the operation mode of the terminal as the sleep mode until a start time of the transmission for the next data frame, and in response to identifying that the destination of the next data frame is not the terminal, determine the operation mode of the terminal as the sleep mode until an end time of the transmission for the next data frame.

12. The chipset of claim 11, wherein the first information further comprises signature information for determining whether the first information is located in front of the data frame or behind the data frame.

13. The chipset of claim 11, further configured to, when the terminal receives the next data frame, determine the operation mode as the sleep mode from a time that the first information was received until a start time of a transaction process for the next data frame.

14. The chipset of claim 11, further configured to, when the terminal does not receive the next data frame, determine the operation mode as the sleep mode from a time that the first information was received until an end time of a transaction process for the next data frame.

15. The chipset of claim 11, further configured to transmit a second information to an access point (AP) and an acknowledgement (ACK) frame for reception of the data frame, wherein the second information is an updated information based on the first information; and when the terminal does not receive the next data frame, determine the operation mode as the sleep mode from a time that the ACK frame was transmitted until an end time of a transaction process for the next data frame.

16. A non-transitory computer-readable storage medium including a computer program for executing a method of controlling power of a terminal, the method comprising:
receiving data including a data frame and first information of a next data frame of the data frame, wherein the first information includes a destination address information of the next data frame and duration information indicating a time during which a transmission of the next data frame occurs; and
determining an operation mode of the terminal as an active mode or a sleep mode based on whether a destination of the next data frame is the terminal by comparing the destination address information of the next data frame with a terminal's address, and duration information of the next data frame,
wherein determining the operation mode of the terminal comprises:
identifying whether the destination of the next data frame is the terminal based on the destination address information included in the first information,
in response to identifying that the destination of the next data frame is the terminal, determining the operation mode of the terminal as the sleep mode until a start time of the transmission for the next data frame, and
in response to identifying that the destination of the next data frame is not the terminal, determining the operation mode of the terminal as the sleep mode until an end time of the transmission for the next data frame.

17. The non-transitory computer-readable storage medium of claim 16, wherein the first information further comprises signature information for determining whether the first information is located in front of the data frame or behind the data frame.

18. The non-transitory computer-readable storage medium of claim 16, further comprising, when the terminal receives the next data frame, determining the operation mode as the sleep mode from a time that the first information was received until a start time of a transaction process for the next data frame.

19. The non-transitory computer-readable storage medium of claim 16, further comprising, when the terminal does not receive the next data frame, determining the operation mode as the sleep mode from a time that the first information was received until an end time of a transaction process for the next data frame.

20. The non-transitory computer-readable storage medium of claim 16, further comprising transmitting a second information to an access point (AP) and an acknowledgement (ACK) frame for reception of the data frame, wherein the second information is an updated information based on the first information; and
when the terminal does not receive the next data frame, determining the operation mode as the sleep mode from a time that the ACK frame was transmitted until an end time of a transaction process for the next data frame.

* * * * *